US009221309B2

(12) United States Patent
Kandler

(10) Patent No.: US 9,221,309 B2
(45) Date of Patent: Dec. 29, 2015

(54) WHEEL LOCALIZER, WHEEL LOCALIZATION DEVICE, SYSTEM, METHOD AND COMPUTER PROGRAM FOR LOCATING A POSITION OF A WHEEL

(75) Inventor: Michael Kandler, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 743 days.

(21) Appl. No.: 13/366,771

(22) Filed: Feb. 6, 2012

(65) Prior Publication Data

US 2013/0204573 A1 Aug. 8, 2013

(51) Int. Cl.
*G06F 15/00* (2006.01)
*G01P 15/00* (2006.01)
*G01M 15/00* (2006.01)
*B60C 23/04* (2006.01)

(52) U.S. Cl.
CPC ......... *B60C 23/0416* (2013.01); *B60C 23/0488* (2013.01)

(58) Field of Classification Search
CPC ........... B60C 23/0488; B60C 23/0416; B06W 2520/28
USPC ............. 340/426.33, 988, 442, 445; 702/148, 702/75, 145, 150; 73/146, 146.2; 701/51, 701/89
See application file for complete search history.

(56) References Cited

U.S. PATENT DOCUMENTS

| 5,058,023 | A | 10/1991 | Kozikaro | |
|---|---|---|---|---|
| 6,204,758 | B1 | 3/2001 | Wacker et al. | |
| 6,389,346 | B1* | 5/2002 | Gianoglio et al. | 701/51 |
| 6,606,549 | B1* | 8/2003 | Murakami et al. | 701/89 |
| 6,826,951 | B1 | 12/2004 | Schuessler, Jr. et al. | |
| 2002/0092346 | A1* | 7/2002 | Niekerk et al. | 73/146.2 |
| 2003/0043031 | A1* | 3/2003 | Nowottnick et al. | 340/438 |
| 2003/0058118 | A1 | 3/2003 | Wilson | |
| 2006/0087420 | A1* | 4/2006 | Walraet | 340/445 |
| 2007/0156320 | A1* | 7/2007 | Breed et al. | 701/70 |
| 2008/0129478 | A1* | 6/2008 | Fink et al. | 340/447 |
| 2009/0088939 | A1* | 4/2009 | To et al. | 701/72 |
| 2010/0245068 | A1 | 9/2010 | Nakayama | |

(Continued)

FOREIGN PATENT DOCUMENTS

| CN | 101509818 A | 8/2009 |
|---|---|---|
| CN | 101592732 A | 12/2009 |

(Continued)

OTHER PUBLICATIONS

Johnson Controls. "A Better Way to Check Tire Pressure." Published/Copyright 2013. 2 Pages. Retrieved from http://translate.google.com/translate?hl=en&sl=de&u=http://www.johnsoncontrols.de/content/de/de/products/automotive_experience/featured-stories/advanced-tpms.html&prev=/search%3Fq%3Dhttp://www.johnsoncontrols.de/content/de/de/products/automotive_experience/featured-stories/advanced-tpms.html%26biw%3D1115%26bih%3D535.

(Continued)

*Primary Examiner* — John H Le
(74) *Attorney, Agent, or Firm* — Eschweiler & Associates, LLC

(57) ABSTRACT

Embodiments can provide a system, a wheel localizer, a wheel localization device, a method or a computer program for locating a position of wheel. The system for locating the position of the wheel on the vehicle includes a detector for obtaining information related to a state of movement of the vehicle and a locator for determining the position of the wheel based on the information related to the state of movement of the vehicle.

28 Claims, 5 Drawing Sheets

(56) References Cited

U.S. PATENT DOCUMENTS

| | | |
|---|---|---|
| 2010/0256874 A1 | 10/2010 | Carresjo et al. |
| 2011/0016996 A1 | 1/2011 | Suda et al. |
| 2011/0308310 A1* | 12/2011 | Strahan .................. 73/146.5 |
| 2012/0029767 A1* | 2/2012 | Bailie et al. ................ 701/36 |
| 2012/0065832 A1 | 3/2012 | Kessler et al. |

FOREIGN PATENT DOCUMENTS

| | | |
|---|---|---|
| CN | 201670174 U | 12/2010 |
| CN | 202138166 U | 2/2012 |
| JP | 2003154961 A | 5/2003 |
| WO | 2010022806 A1 | 3/2010 |

OTHER PUBLICATIONS

U.S. Appl. No. 13/969,742, filed Aug. 19, 2013. 56 Pages.
Kiencke, et al., Automotive Control Systems: For Engine, Driveline, and Vehicle, 2005, Springer-Verlag Berlin Heidelberg, Ed 2, p. 310-312.
Non Final Office Action Dated Aug. 18, 2014 U.S. Appl. No. 13/969,742.
Final Office Action Dated Apr. 28, 2015 U.S. Appl. No. 13/969,742.
Notice of Allowance Dated Sep. 17, 2015 U.S. Appl. No. 13/969,742.

\* cited by examiner

FL  Front Left tire
FR  Front Right tire
RL  Rear Left tire
RR  Rear Right tire
RFL Radius of FL
RFR Radius of FR
RRL Radius of RL
RRR Radius of RR
S   Distance between left and right wheels
L   Distance between front and rear wheels
C   Center of Curve
RC  Radius of Curve 200 wheel localizer
210 detector
212 detector output
220 locator
222 locator input
224 locator output
226 additional locator input 300 wheel localization device
310 input for signal comprising information on a state of movement
312 input for receiving signals comprising information indicating rotational frequencies
314 input for receiving signals comprising information indicating a tire parameter
320 unit to assign to each of the plurality of wheels one location

WHEEL LOCALIZER, WHEEL LOCALIZATION DEVICE, SYSTEM, METHOD AND COMPUTER PROGRAM FOR LOCATING A POSITION OF A WHEEL

FIELD

Embodiments of the present invention relate to a wheel localizer, a wheel localization device, a method, a system and a computer program for locating a position of a wheel.

BACKGROUND

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMS provide localization information on the tire or wheel on top of pressure information so as to indicate to a driver of a vehicle the position of a wheel having a pressure loss. Examples are indications on whether a pressure loss of a tire of a wheel of a car is on the Front Left (FL) tire, the Front Right (FR) tire, the Rear Left (RL) tire, and/or the Rear Right (RR) tire. After replacement of a wheel or tire, assignment or re-assignment of the sensor signals to the positions on the vehicle may be necessary. Such assignment can be carried out manually, for example, by using a Low-Frequency (LF) initializer, which is used to initialize each individual sensor upon indication from a system receiver. The initialization can be affected by sequentially activating an LF-initiator in the proximity of the respective sensor and receiving an according response with a unique identification from the sensor.

Some known TPMS systems utilize multiple LF-initializers, e.g. in terms of transmitter coils or inductors, for initialization of each individual sensor or wheel, for example. Such LF-initializers can be mounted in the wheel housing of each wheel. The number of involved LF-initializers, however, may render such an approach uneconomic. Other concepts make use of different reception levels of the LF-radio signals using transmitter coils at different locations asymmetric to the wheels, e.g. one in the front and one in the back. These concepts are extensive and unsuitable for after-market installation. Further concepts make use of the varying reception power of the RF-signals transmitted by the sensors. The reception power of such an RF-signal can be measured and the different locations can be distinguished by the different reception levels, e.g. evoked by different distances of the wheels. The larger the distance between a wheel and the corresponding receiver the lower the reception power. In some cars a distinction between the signals from the front and the signals from the back is possible, a distinction between signals from the left and right is rather difficult. This concept may suffer from the complex propagation paths of the wireless signals, which may render an assignment of a reception level of a signal to a certain wheel difficult.

Another concept uses ABS (Anti-lock Braking System) signals to determine rotational frequencies of the wheels and relate them to rotational frequencies determined based on TPMS signals. This concept, however, may be difficult to establish if the signals of the ABS system cannot be made available. This may render the concept unsuitable for after-market systems.

SUMMARY

Embodiments make use of information on a state of movement of a vehicle. In the following a vehicle can be any vehicle using tires, as, for example, a car, a van, a truck, a bus, a plane, a bike, a motorbike, etc. Although, many embodiments will be exemplified using a car, any other vehicle can be utilized in the embodiments. The state of movement may have implications on the location and a state of a wheel. In the following the state of movement of a vehicle refers to a movement status, a motion status, a driving or movement situation, a movement or driving condition, etc., as for example, a forward movement, a backward movement, a movement along a right hand bend or curve, a movement along a left hand bend or curve, etc.

Embodiments may provide a system for locating a position of a wheel on a vehicle. The system may comprise a detector for obtaining information related to the state of movement of the vehicle and a locator for determining the position of the wheel based on the information related to the state of movement of the vehicle. In further embodiments the locator may be operable to further use information on a rotational frequency of the wheel to determine the position of the wheel based on the information related to the state of movement of the vehicle. Embodiments may make use of the finding that a certain state of movement of a vehicle may imply a certain relation of the rotational frequencies of the wheels. In other words, embodiments may make use of the finding that the RR wheel of a car moving forward along a right hand bend may have a lower rotational frequency than any of the other wheels on the car, assuming equal circumferences of the wheels. Therefore, if the information related to the state of movement indicates a forward right hand bend the locator may determine the position of the wheel being indicated as the one with the lowest rotational frequency as the RR wheel.

In some embodiments the information related to the state of movement may comprise information on a sense of a rotation of the vehicle. The sense of rotation of a vehicle may be used to determine expected rotational frequencies or expected relations of rotational frequencies of the wheels associated to the sense of rotation of the vehicle. In further embodiments the information related to the state of movement may comprise information on a direction of the movement of the vehicle, e.g. information on whether the vehicle moves forward or backward, along a right hand bend or a left hand bend, etc. Information on the direction of the movement of the vehicle may also be used to determine expected rotational frequencies or expected relations of rotational frequencies of the wheels associated to the sense of rotation of the vehicle.

The locator may be operable to use information on rotational frequencies for each of a plurality of wheels on the vehicle, as, for example, four wheels of a car. The locator may be further operable to determine a position for each of the plurality of wheels on the vehicle based on the information on the plurality of rotational frequencies and the information related to the state of movement of the vehicle. In other words, the locator may determine predefined positions of the four wheels of a car, by determining four rotational frequencies, one for each of the wheels, and by determining four expected rotational frequencies based on the information related to the state of movement.

Hence, in further embodiments the locator may be operable to use information on rotational frequencies for each of the plurality of wheels on the vehicle and determine the position for each of the plurality of wheels on the vehicle based on the information on the plurality of rotational frequencies and the information related to the state of movement of the vehicle. Moreover, the locator may be operable to assign predefined positions on the vehicle to each of the plurality of wheels based on the information on the plurality of rotational frequencies and expected rotational frequencies, wherein the expected rotational frequencies are based on the information related to the state of movement. In other words, embodiments may be based on the finding that if the information on the state of movement indicates that a car as a vehicle moves forward along a right hand bend, then the expected rotational frequency of the RR wheel is the lowest and that of the FL wheel is the highest. A correlation or a matching of the expected rotational frequencies based on the information on the state of movement and the information on the rotational frequencies of the wheels may be carried out to determine the positions of the wheels.

In an embodiment, the locator may be operable to sort the wheels based on their rotational frequencies, sort the predefined positions of the wheels based on the state of movement and a corresponding rotational velocity of the wheels, and match the ranks of the sorted wheels and the sorted predefined positions.

Moreover, in embodiments the system or the detector may comprise a sensor for determining the information related to the state of movement. The sensor may generate a signal based on which the information related to the state of movement can be determined. The sensor may correspond to at least one of an inertial sensor, a micro-mechanical sensor, an acceleration sensor, or a gyroscope for generating a signal based on which the state of movement is detectable. In some embodiments the system may further comprise an acceleration sensor, an energy harvester, or a TPMS sensor to obtain the information on the rotational frequency of the wheel.

The system may be operable to verify signals involved in the location determination before actually determining the location or position of a wheel, or before determining any signal based on which the location should be determined subsequently, respectively. In other words, the system may be operable to determine the location of the wheel or signals based on which the location of the wheel can be determined, when the information related to the state of movement of the vehicle indicates a certain state of movement. Furthermore, the system may determine the location of the wheels or the respective signals, only if the certain state of movement is maintained for a certain time period. In other words, in embodiments the system may be operable to determine the location of the wheel or the respective signals only if a stable or an enduring state of movement has been detected before. Thus, in embodiments the system may be operable to verify a signal indicating the rotational frequency of the wheel and a signal indicating the state of movement of the vehicle before using the signals as information to determine the position of the wheel. In yet another embodiment the system may be operable to verify whether the rotational frequency of the wheel and a rotational rate of the vehicle, which is based on the state of movement of the vehicle, fulfill a predefined relation for a predefined time interval, e.g. their quotient has not been above or below a certain threshold. Thus, the locator may be operable to determine the position of the wheel, when changes of the state of movement of the vehicle have been below a predefined threshold for a predefined time interval.

Furthermore, in embodiments the locator may be operable to determine a corrected rotational frequency of the wheel based on information on a tire pressure of a tire of the wheel and based on the rotational frequency of the wheel. The locator may be operable to determine the position of the wheel based on the corrected rotational frequency. Thus, if a tire pressure signal is available, the rotational frequency of a wheel may be corrected based on the tire pressure signal. For the location determination the corrected signal may then be taken into account.

In line with the above summary for embodying a system for locating a position of a wheel on a vehicle, embodiments may provide a wheel localizer for locating the position of the wheel on the vehicle. The wheel localizer may comprise a detector with an output for a movement signal comprising information on a state of movement of the vehicle. In other words, the movement signal may comprise information related to the state of movement of the vehicle. The wheel localizer further comprises a locator with an input terminal for the movement signal, and an output for a location signal comprising information on the position of the wheel, which is based on the information on the state of movement of the vehicle.

Moreover, embodiments may provide a corresponding wheel localization device, which comprises an input for receiving a signal comprising information on the state of movement of the vehicle. Such a signal may, in some embodiments, be generated by a sensor. The input further receives signals comprising information indicating rotational frequencies of each of a plurality of wheels of the vehicle, e.g. for each of the four wheels of a car. In some embodiments acceleration sensors or TPMS sensors in the wheels or tires may be used to determine signals based on which the rotational frequencies are determined. The input further receives signals comprising information indicating a tire parameter for each of the plurality of wheels, which may, in some embodiments, be TPMS signals from a TPMS sensor. The wheel localization device further comprises a unit to assign to each of the plurality of wheels one location of a set of predefined locations based on the information on the state of movement and the information on the rotational frequencies.

Furthermore, embodiments may provide a method for locating a position of a wheel on a vehicle. Such method may be part of a computer program in some embodiments. In other words, the computer program may have a program code for performing, when the computer program is executed on a computer or on a processor, one of the methods described herein. Such a method may comprise obtaining information related to a state of movement of the vehicle and determining the position of the wheel based on the information related to the state of movement of the vehicle.

Embodiments may also provide a device comprising a wheel localizer to determine for each of a plurality of wheels of a vehicle a position. The wheel localizer may be configured to determine a wheel position based on information indicating a rotational frequency of each wheel and information related to a rotation of the vehicle. The information indicating the rotational frequency of the wheel may be determined from a signal, which is generated in the tire of the respective wheel. In some embodiments such a signal may be generated using a TPMS sensor in the respective wheel.

An advantage of embodiments may be that information on the state of movement of the vehicle can be used to determine expected rotational frequencies of the wheels. Embodiments may therefore be independent from other systems such as ABS. Moreover, embodiments may localize a wheel on a vehicle without utilizing LF-initializers, and without determining RF reception levels. Embodiments may therefore be more cost effective, even compared to concepts using one asymmetric LF-transmitter per axis, e.g. one in the front and one in the back, making use of different LF-reception levels at the receivers.

It may be an advantage of embodiments that a comparison of rotational frequencies of other systems, such as ABS, may be circumvented. These systems may utilize information on a rotational frequency of each wheel at a centralized receiver. The information on the rotational frequencies may then be compared to the rotational frequencies of the ABS system. For some determined driving situations different rotational frequencies result and the correlation of the rotational frequencies determined through ABS and another sensor may be used to find the respective positions of the wheels. The determination of the rotational frequency may be a function of the TPMS module in the wheels. Embodiments may overcome the disadvantage of such systems, accessing the ABS information, which are conceivable in Original Equipment Manufacturer (OEM) systems, where a TPMS and an ABS system are provided or developed by the same tier. If TPMS and ABS are developed in separate tiers, for a conventional system a need for a standardized interface arises and additional connection or wiring may be necessary. Moreover, the ABS signal would have to be adapted to the correlation with respect to its data rate and its downtimes. Therefore, embodiments provide the advantage that they may not rely on ABS' or other capsulated system's signals and are therefore better suitable for after-market implementations.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Figure 1:
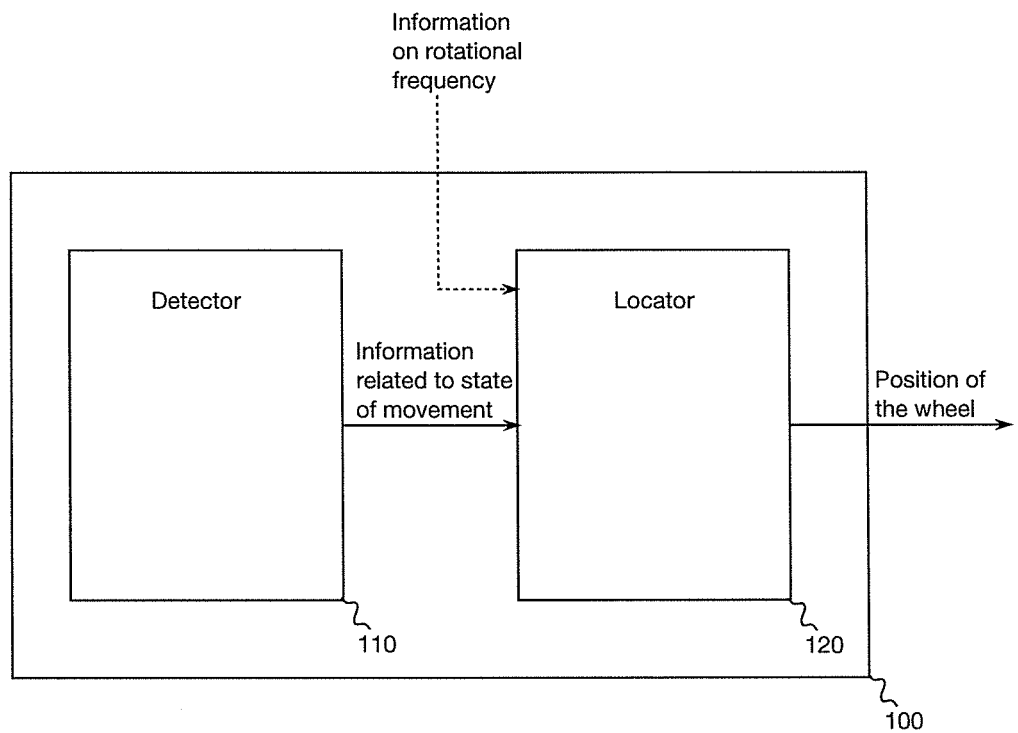
FIG. 1 shows an embodiment of a system for locating a position of a wheel.

FIG. 1 shows an embodiment of a system 100 for locating a position of a wheel on a vehicle. The system 100 comprises a detector 110 configured to obtain information related to a state of movement of the vehicle, and a locator 120 configured to determine the position of the wheel based on the information related to the state of movement of the vehicle. The locator 120 may be operable to further use information on a rotational frequency of the wheel to determine the position of the wheel based on the information related to the state of movement of the vehicle as indicated by the dotted arrow in FIG. 1.

The information on the rotational frequency of the wheel may be obtained using an acceleration sensor, which may be further comprised in the system 100. The acceleration sensor may be installed on the wheel such that a sensitive axis of the acceleration sensor has a radial orientation. Hence it senses a change in the acceleration of gravity when the wheel turns, in particular a +/−g change.

In other embodiments, TPMS sensors may be used to determine the information on the rotational frequency of the wheel. A TPMS sensor may be mounted on the cover of the tire such that a g-pulse is measured when the TPMS sensor hits the surface of the road. An acceleration sensor may be used in the TPMS sensor, e.g. for that purpose. The TPMS sensor may be equipped with an energy harvester or a nano generator, e.g. as they are used in battery-free TPMS sensors, which convert the mechanical energy of the pulse when the TPMS sensor hits the ground into an electrical signal from which the information on the rotational frequency of the wheel can be determined. In further embodiments the system may use an acceleration sensor to determine the information on the rotational frequency of the wheel, e.g. by making use of gravity. Yet another embodiment of the system may comprise a TPMS sensor to obtain the information on the rotational frequency of the wheel by evaluating the cyclic variations of the TPMS-RF signals.

In the embodiment depicted in FIG. 1 the locator 120 is operable to use information on rotational frequencies for each of a plurality of wheels on the vehicle, e.g. the four wheels of a car. Moreover, the locator 120 is operable to determine a position for each of the plurality of wheels on the vehicle based on the information on the plurality of rotational frequencies and the information related to the state of movement of the vehicle. In other words, the system 100 may use multiple sensors for the determination of the rotational frequencies of the wheels, e.g. it may use one sensor per wheel.

The system 100 illustrated in FIG. 1 may form an autonomous system for locating the wheel in one embodiment, which is independent from other systems such as ABS, and other data from the vehicle. The independence can be achieved by using the information related to the state of movement of the vehicle, which may comprise information on a sense of a rotation of the vehicle and/or information on a direction of movement of the vehicle. The system 100 or the detector 110 may detect the information on the state of movement of the vehicle based on a corresponding sensor. For example, the system 100 or the detector 110 may comprise an inertial sensor, which enables determination of the information related to the state of movement of the vehicle.

In other embodiments the system 100 or the detector 110 may comprise a micro-mechanical sensor (Micro-Electro-Mechanical Systems (MEMS)), an acceleration sensor, or a gyroscope for generating a signal based on which the state of movement is detectable. The inertial sensor may correspond to a rotation rate sensor or a combination of a rotation rate sensor and a single- or multi-axial acceleration sensor. A sensitive axis of the rotational rate sensor may be oriented basically orthogonal to a movement plane of the vehicle, such that the sensor can be used as yaw-sensor. In embodiments, the inertial sensor may not be located in a wheel but at a more central position, e.g. in the receiver for the TPMS-RF signals. Therefore, any additional power consumption evoked by the inertial sensor may not be relevant in embodiments; such additional power consumption may range at about 5 mA.

It is to be noted that in embodiments the absolute accuracy of such an inertial sensor may not be very high. As the sensor may only be used to determine a certain state of movement or a movement situation in one embodiment, e.g. a certain rotational rate or directional movement of the vehicle. In other words, a certain state of movement may be determined before the localization of the wheel is carried out. Since the accuracy or precision demands for the sensor are low, embodiments of the system 100 can be economically implemented. For example, a MEMS inertial sensor may be used, as it is produced in high numbers for other applications already.

Thus, an algorithm for localizing the wheel may be carried out in a certain state of movement of the vehicle, it may be carried out based on signals obtained in the certain state of movement of the vehicle, respectively. In other words, the detector 110 may use the inertial sensor to determine whether the vehicle moves along a left hand bend or along a right hand bend. Moreover, the detector 110 may determine whether the vehicle moves in a forward or in a backward direction. For example, a comparison of the rotational frequencies of the wheels with the rotational rate of the vehicle may determine or trigger an operating point for the localization. Thus, in embodiments the system 100 may also be operable to verify a signal indicating the rotational frequency of the wheel and a signal indicating the state of movement of the vehicle before using the signals as information to determine the position of the wheel. For example, the system 100 may be operable to verify that the rotational frequency of the wheel and a rotational rate of the vehicle, which is based on the state of movement of the vehicle, fulfill a predefined relation for a predefined time interval. In embodiments such verification may be carried out using different mechanisms. According to another embodiment, the locator 120 is operable to determine the position of the wheel when changes of the state of movement of the vehicle are below a predefined threshold for a predefined time interval. That is to say, the position of the wheel is determined when the state of movement of the vehicle is stable to a certain extent, e.g. when variations of a certain rotational rate of the vehicle and the rotational frequencies of the wheels remain in certain boundaries.

The locator 120 may then assign predefined positions on the vehicle to each of the plurality of wheels based on the information on the plurality of rotational frequencies and on expected rotational frequencies, wherein the expected rotational frequencies are based on the information related to the state of movement. In line with what is described above, in some embodiments the sense of movement, i.e. whether the vehicle moves forward or backward and whether it rotates clockwise or counterclockwise, serves as a basis for the localization and an inertial sensor may be used to generate a signal based on which the sense of movement is determined. Other embodiments may use other means to determine the state or sense of movement. For example, in some embodiments other signals available from the vehicle may be used. For example, an indication on whether the vehicles moves forward or backward may be obtained from the transmission components, such as an indication for a reversing or back-up light. Moreover, signals from a power steering unit may be used to determine whether the vehicle steers towards a right hand bend or a left hand bend.

Furthermore, the information on rotational frequencies of the wheels may be used to determine information related to the state of movement. For example, if a certain rotational frequency is exceeded, e.g. a certain threshold for the rotational frequency, it may be assumed that the vehicle moves forward, as the backward speed of most vehicles is limited. A comparison of the minimum and maximum rotational frequencies of all tires may determine whether the vehicle moves along a bend since the tires closer to a center of a bend or curve rotate slower than tires farther away from the center of the curve. As will be shown in more detail subsequently, if a vehicle moves through a given bend, certain rotational rates or relations of the rotational rates result for its wheels.

In some embodiments a backward movement of the vehicle may be precluded using other measures as described above. In such an embodiment a rotational sensor with a single axis can be used to determine a signal based on which the information related to the state of movement is detected. The sensitive axis of such a sensor may then be oriented in parallel to the normal (z-axis) of the plane of movement of the vehicle. When the vehicle moves along a right hand bend the rotational sensor may provide a negative output signal, a positive output signal may result in a left hand bend. Backward movement may be precluded by determining a certain duration of such a signal, since long time backward movements are unlikely.

In some embodiments, determination or preclusion of a backward movement may be used to determine the sense of rotation of the vehicle. For example, a forward movement along a right hand bend may result in the same sense of rotation as a backward movement along a left hand bend. The determination or preclusion of the backward movement may then be used to distinguish the right and left hand wheels of the vehicle.

In order to distinguish four different states of movement using a combined sensor comprising a rotational rate sensor and a lateral acceleration sensor may be used as an inertial sensor in a particular embodiment. The sensitive axis of the acceleration sensor corresponds to the lateral axis of the vehicle (y-axis), i.e. to the axis pointing in radial direction when the vehicle moves along a bend or curve. The outputs of the two sensors are given by the following table:

| Driving situation, state of movement | Rotational rate sensor | Acceleration sensor |
| --- | --- | --- |
| Forward, right hand bend | negative | negative |
| Forward, left hand bend | positive | positive |
| Backward, right hand bend | positive | negative |
| Backward, left hand bend | negative | positive |

The table shows that a non-ambiguous distinction of the four states is enabled using the combined sensor. Embodiments may make use of the finding that the rotational frequencies of the wheels, e.g. of the four wheels of a car, differ by multiple percent especially when the vehicle moves along narrow curves or bends. This assumption is based on a further assumption that the circumference or the perimeter of the wheels is essentially similar. Some embodiments may assume that the localization of the wheels is carried out directly after a change of the wheels and that the air pressure in the tires of the wheels corresponds to a set pressure according to the respective manufacturer's requirements. This leads to the conclusion that the circumferences of the tires are essentially equal. Other embodiments may assume that the air pressure of all tires and their circumferences are the same.

Yet other embodiments may use TPMS signals to correct the information on the rotational frequencies. In other words, such embodiments may determine the rotational frequency of a wheel and the corresponding air pressure in the tire of said wheel. If the air pressure differs from a predefined air pressure setting for the wheel, the rotational frequency may be corrected accordingly, i.e. if the air pressure is too low a corrected rotational frequencies may be increased, or decreased if the air pressure of the tire is too high. In other words, the locator 120 may be operable to determine a corrected rotational frequency of the wheel based on information on a tire pressure of a tire of the wheel and based on the rotational frequency of the wheel. The locator 120 may then be operable to determine the position of the wheel based on the corrected rotational frequency. Moreover, it is assumed that each wheel or sensor provides its signal together with a non-ambiguous IDentification (ID), such that each signal can be unambiguously associated to the respective wheel or sensor.

The algorithm of an embodiment may then comprise the following steps. At first, a reference wheel (unique ID) may be selected and based on the rotational frequency of the reference wheel and the rotational rate of the vehicle an advantageous operating point or state of movement of the vehicle is determined. Once the operating point is reached, the rotational frequencies of the four wheels are determined and compared. For a given state of movement, e.g. a forward right hand bend, the relations of the rotational frequencies of the wheels are predetermined, e.g. which wheel has the highest and which wheel has the lowest rotational frequency. Thus expected rotational frequencies or relations thereof may be determined based on the state of movement. Each of the four wheels may then be associated with a respective position, e.g. by matching the expected rotational frequencies with the detected rotational frequencies of the wheels. The rotational rate and direction of movement of the vehicle may be determined based on signals that are measured by the inertial sensor. In some embodiments the procedure just described may be repeated until a certain statistical confidence is achieved.

Figure 2:
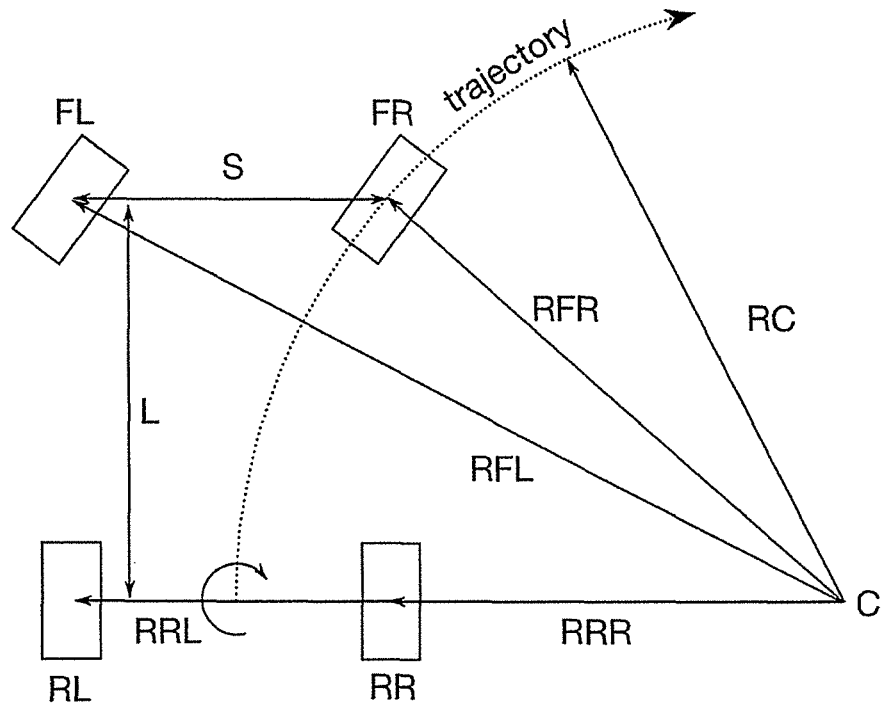
FIG. 2 shows four wheels of a vehicle, which are positioned in an embodiment.

FIG. 2 illustrates the four wheels of a vehicle in an embodiment. FIG. 2 shows two front wheels FL and FR, as well as two rear wheels RL and RR. Moreover, in the illustration of FIG. 2 it is assumed that the vehicle moves along a forward right hand bend, where the center of the bend or curve is indicated by C. The angle of the front wheels FL and FR indicates movement along the right hand bend. It is further assumed that the distance between left and right wheels is S, i.e. the distance between FL and FR, as well as between RL and RR, respectively. Moreover, the distance between front and rear wheels is assumed to be L, i.e. the distance between FL and RL, between FR and RR, respectively. FIG. 2 further depicts the radii of each of the wheels and the curve or trajectory itself using different arrows. The radius of the curve or bend itself is labeled RC, the radius of the RR wheel is termed RRR, the radius of the RL wheel is termed RRL, the radius of the FL wheel is termed RFL, and the radius of the FR wheel is termed RFR. Furthermore, the trajectory of the FR wheel is given using a dotted arrow, which points along a circular segment.

The geometry of the vehicle shown in FIG. 2 allows deriving expected rotational frequencies of wheels and relations thereof based on the distances L, S, and RC. As it can be seen from FIG. 2 each of the wheels travels along a different radius (RRR, RRL, RFL, RFR) around the center C of the curve, resulting in different distances, and thus in different rotational frequencies, when equal circumferences for the wheels are assumed. The velocity of each wheel is then proportional to the radius of the wheel's trajectory, to its rotational frequency, respectively. Moreover, the shorter the radius of the curve, i.e. the narrower the curve, the higher the difference in the individual radii (RRR, RRL, RFL, RFR). The radii can be given using the following equations:

$$RRL = RC + \frac{S}{2},$$

$$RRR = RC - \frac{S}{2},$$

$$RFL = \sqrt{L^2 + \left(RC + \frac{S}{2}\right)^2},$$

and $$RFR = \sqrt{L^2 + \left(RC - \frac{S}{2}\right)^2}.$$

The equations show that the difference in the rotational frequencies of the wheels depends on the radius RC of the curve itself, the wheel base L, and the wheel track S.

Considering the geometry of a typical compact car, e.g. a Volkswagen Golf, and different radii RC of the curve the following table can be calculated using the above equations and using the RR wheel as a reference. A forward movement along a right hand curve yields:

| Radius of the Curve | Relative rotational frequency with respect to RR | | | |
| --- | --- | --- | --- | --- |
| RC [m] | RR [%] | FR [%] | RL [%] | FL [%] |
| 5.0 | 0.00 | 14.54 | 26.69 | 33.03 |
| 7.5 | 0.00 | 6.58 | 18.62 | 22.29 |
| 10.0 | 0.00 | 3.66 | 14.30 | 16.64 |
| 15.0 | 0.00 | 1.59 | 9.77 | 10.94 |
| 20.0 | 0.00 | 0.88 | 7.41 | 8.12 |
| 25.0 | 0.00 | 0.56 | 5.98 | 6.44 |

The table shows that the relative difference in the rotational frequencies increases with decreasing radius RC of the curve or bend. Therefore, some embodiments may determine a movement along a narrow curve as an operating point. In other words, in some embodiments it is verified that the vehicle moves along a narrow curve before determining the rotational frequencies based on which the wheels are positioned. Determination of such an operating point may therefore correspond to the determination of a small radius RC of the curve. In some embodiments a measurement of the rotation rate of the vehicle may not be sufficient, since a fast movement along a curve or bend with a large radius may result in the same rotational rate for the vehicle as a slow movement along a curve or bend with a small radius. Some embodiments may therefore evaluate a quotient of the rotational frequency of a reference wheel and the rotational rate for the vehicle, which is proportional to the radius of the curve and may therefore support the determination of a proper operating point.

As it has already been mentioned above in embodiments it may first be verified that the signals or frequencies which are used for such a comparison are stable to a certain extent. For example, a certain time period may be evaluated during which variations of the respective signals are below a threshold. Embodiments may therefore prevent errors or deviations, which could occur when the vehicle moves along a sinuous line at a higher speed. In implementations of embodiments, advantageous ranges for the rotational frequencies of the wheels and the rotational rate of the vehicle may be determined experimentally.

Embodiments may also provide a device comprising a wheel localizer to determine for each of a plurality of wheels of a vehicle a position, the wheel localizer being configured to determine a wheel position based on information indicating a rotational frequency of each wheel and information related to a rotation of the vehicle.

Figure 3:
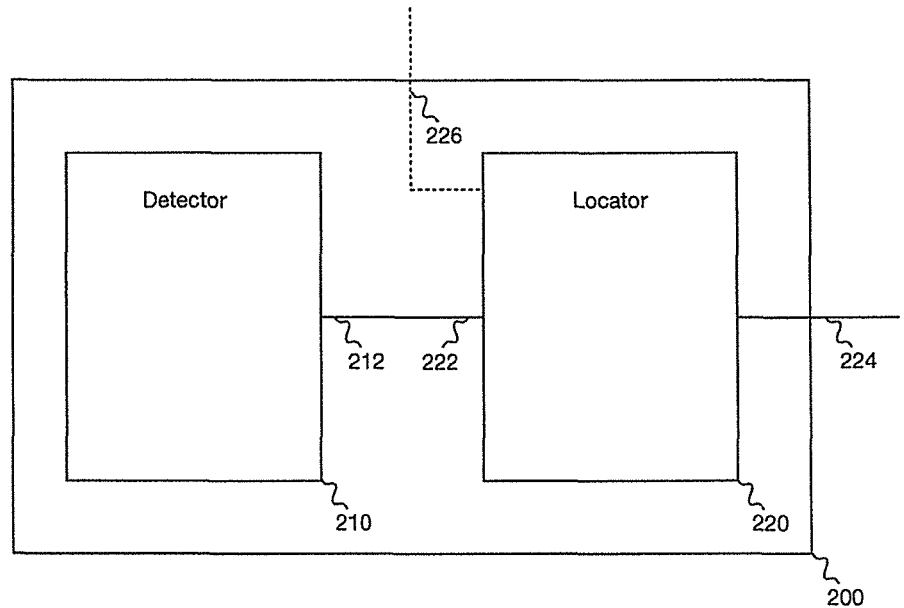
FIG. 3 illustrates an embodiment of a wheel localizer.

In embodiments the system 100 of FIG. 1 may be implemented as a wheel localizer 200 for locating a position of a wheel on the vehicle. FIG. 3 illustrates an embodiment of a wheel localizer 200. The wheel localizer 200 comprises a detector 210 with an output 212 for a movement signal comprising information on a state of movement of the vehicle. The detector 210 may correspond to the above described detector 110. The wheel localizer 200 further comprises a locator 220 with an input terminal 222 for the movement signal, and an output 224 for a location signal comprising information on the position of the wheel, which is based on the information on the state of movement of the vehicle. As shown in FIG. 3 the input 222 of the locator 220 is coupled with the output 212 of the detector 210. The locator 220 may correspond to the above described locator 120.

In line with the above description, the detector 210 may comprise at least one of a sensor, an inertial sensor, a micromechanical sensor, an acceleration sensor, or a gyroscope for sensing the state of movement of the vehicle. The locator 220 may further comprise an additional input 226, which is indicated in FIG. 3 by the dotted line, for a signal comprising information on a rotational frequency of the wheel. In embodiments at least one of a sensor, an acceleration sensor, an energy harvester, or a tire pressure monitoring system sensor may be coupled to the locator 220, to provide a signal comprising information on a rotational frequency of the wheel.

In line with what was described above, the locator 220 may also comprise one or more inputs 226 for signals comprising information on a plurality of rotational frequencies for each of a plurality of wheels. The locator 220 may be operable to determine a plurality of locations for the plurality of wheels on the vehicle, based on the information on the plurality of rotational frequencies and on the information of the state of movement. The locator 220 may be operable to assign predefined positions on the vehicle to each of the plurality of wheels based on the information on the plurality of rotational frequencies and expected rotational frequencies, wherein the expected rotational frequencies are based on the information of the state of movement.

In further embodiments the wheel locator 200 may be operable to verify the signal comprising information on the rotational frequency of the wheel and the movement signal comprising the information on the state of movement of the vehicle, before using these signals as information to determine the position of the wheel. The wheel localizer 200 may, for example, be operable to verify that the signal comprising the information on the rotational frequency of the wheel and the movement signal comprising the information on the state of movement of the vehicle fulfill a predefined relation for a predefined time interval.

Figure 4:
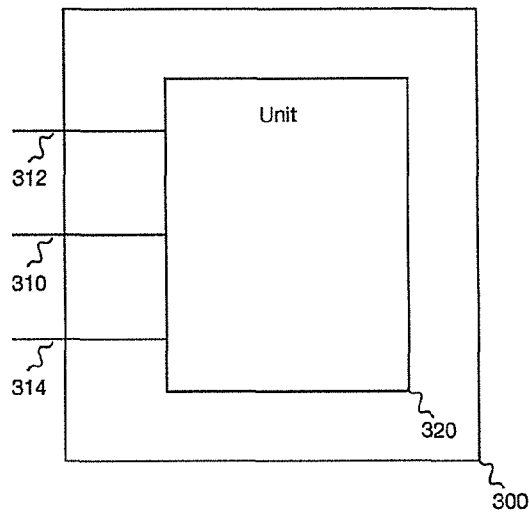
FIG. 4 illustrates an embodiment of a wheel localization device.

FIG. 4 illustrates an embodiment of a wheel localization device 300. The wheel localization device comprises an input 310 for receiving a signal comprising information on a state of movement of a vehicle. The device 300 further comprises an input 312 for receiving signals comprising information indicating rotational frequencies of each of a plurality of wheels of the vehicle, and an input 314 for receiving signals comprising information indicating a tire parameter for each of the plurality of wheels. In the embodiment in FIG. 4 separate inputs 310, 312 and 314 are shown. In other embodiments a single input 310 may be used for all signals instead. The device further comprises a unit 320 to assign to each of the plurality of wheels one location of a set of predefined locations based on the information on the state of movement and the information on the rotational frequencies.

Figure 5:
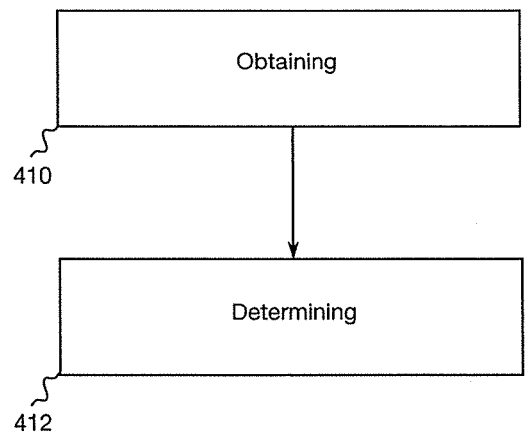
FIG. 5 shows a flow chart of an embodiment of a method for locating a position of a wheel on a vehicle.

Embodiments further provide a method. FIG. 5 shows a flow chart of an embodiment of a method for locating a position of a wheel on a vehicle. The method comprises obtaining 410 information related to a state of movement of the vehicle and determining 412 the position of the wheel based on the information related to the state of movement of the vehicle.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are ma-chine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PGAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A system for locating a position of a wheel on a vehicle, comprising:
   a detector device configured to obtain information related to a state of movement of the vehicle; and
   a locator device configured to determine the position of the wheel based on the information related to the state of movement of the vehicle,
   wherein an input of the locator device is coupled with an output of the detector device,
   wherein the locator device is configured to further use information on a rotational frequency of the wheel to determine the position of the wheel based on the information related to the state of movement of the vehicle,
   wherein the system is configured to verify that a signal indicating the rotational frequency of the wheel and a signal indicating the state of movement of the vehicle fulfill a predetermined relationship with respect to one another, before using the signals as information to determine the position of the wheel, and
   wherein the determined wheel position is configured to be sent to a controller configured to associate the determined wheel position with a sensor of a tire pressure monitoring system.

2. The system of claim 1, wherein the information related to the state of movement comprises information on a rotation of the vehicle.

3. The system of claim 1, wherein the detector device comprises at least one of an inertial sensor, a micro-mechanical sensor, an acceleration sensor, or a gyroscope, wherein each are configured to generate a signal based on which the state of movement is detectable.

4. The system of claim 1, wherein the locator device is operable to use information on rotational frequencies for each of a plurality of wheels on the vehicle and determine a position for each of the plurality of wheels on the vehicle based on the information on the plurality of rotational frequencies and the information related to the state of movement of the vehicle.

5. The system of claim 4, wherein the locator device is operable to assign predefined positions on the vehicle to each of the plurality of wheels based on the information on the plurality of rotational frequencies and expected rotational frequencies, wherein the expected rotational frequencies are based on the information related to the state of movement.

6. The system of claim 1, further comprising an acceleration sensor, an energy harvester, or a tire pressure monitoring system sensor configured to obtain the information on the rotational frequency of the wheel.

7. The system according to claim 1, wherein the system is operable to verify that the rotational frequency of the wheel and a rotational rate of the vehicle, which is based on the state of movement of the vehicle, fulfill the predetermined relationship for a predefined time interval.

8. The system of claim 1, wherein the locator device is operable to determine the position of the wheel when changes of the state of movement of the vehicle are below a predefined threshold for a predefined time interval.

9. The system of claim 1, wherein the locator device is operable to determine a corrected rotational frequency of the wheel based on information on a tire pressure of a tire of the wheel and based on the rotational frequency of the wheel, and wherein the locator device is operable to determine the position of the wheel based on the corrected rotational frequency.

10. The system of claim 1, wherein the system is configured to verify that the vehicle moves along a curve with a small radius by evaluating a quotient of a rotational frequency of a reference wheel and a rotational rate for the vehicle, which is proportional to the radius of the curve, against a threshold.

11. A wheel localizer for locating a position of a wheel on a vehicle, comprising:
    a detector device configured to output a movement signal comprising information on a state of movement of the vehicle; and
    a locator device configured to receive the movement signal, and generate a location signal comprising information on the position of the wheel based on the information on the state of movement of the vehicle,
    wherein an input of the locator device is coupled with an output of the detector device,
    wherein the locator device further comprises an input configured to receive a signal comprising information on a rotational frequency of the wheel, and
    wherein the wheel localizer is further configured to verify that the signal comprising information on the rotational frequency of the wheel and the movement signal comprising the information on the state of movement of the vehicle fulfill a predetermined relationship with respect to one another, before using these signals as information to determine the position of the wheel.

12. The wheel localizer of claim 11, wherein the detector device comprises at least one of a sensor, an inertial sensor, a micro-mechanical sensor, an acceleration sensor, or a gyroscope, wherein each are configured to sense the state of movement of the vehicle.

13. The wheel localizer of claim 11, wherein at least one of a sensor, an acceleration sensor, an energy harvester, or a tire pressure monitoring system sensor is coupled to the locator device.

14. The wheel localizer of claim 11, further configured to verify that the signal comprising the information on the rotational frequency of the wheel and the movement signal comprising the information on the state of movement of the vehicle fulfill a predefined relation for a predefined time interval.

15. The wheel localizer of claim 11, wherein the locator device comprises one or more inputs configured to receive signals comprising information on a plurality of rotational frequencies for each of a plurality of wheels, and wherein the locator device is configured to determine a plurality of locations for the plurality of wheels on the vehicle, based on the information on the plurality of rotational frequencies and on the information of the state of movement.

16. The wheel localizer of claim 15, wherein the locator device is configured to assign predefined positions on the vehicle to each of the plurality of wheels based on the information on the plurality of rotational frequencies and expected rotational frequencies, wherein the expected rotational frequencies are based on the information of the state of movement.

17. The wheel localizer of claim 11, wherein the locator device further comprises an input configured to receive a signal comprising information on a tire pressure of a tire of the wheel, and wherein the locator device is operable to determine a corrected rotational frequency of the wheel based on the information on the tire pressure of the tire of the wheel, and wherein the locator device is operable to output the information on the location of the wheel based on the corrected rotational frequency.

18. The wheel localizer of claim 11, wherein the state of movement includes information related to a combination of a left turn/right turn information with the forward/backward information.

19. The wheel localizer of claim 18, wherein the state of movement is determined by a combination of a rotation rate sensor signal and an acceleration sensor signal.

20. The wheel localizer of claim 11, further configured to verify that the vehicle moves along a narrow curve before determining the rotational frequencies based on which the wheel is positioned.

21. The wheel localizer of claim 20, wherein the wheel localizer is configured to evaluate a quotient of a rotational frequency of a reference wheel and a rotational rate for the vehicle against a threshold to verify that the vehicle moves along the narrow curve.

22. A wheel localization device, comprising:
an input unit configured to receive a signal comprising information on a state of movement of a vehicle, signals comprising information indicating rotational frequencies of each of a plurality of wheels of the vehicle, and signals comprising information indicating a tire parameter for each of the plurality of wheels; and
a controller unit configured to assign to each of the plurality of wheels one location of a set of predefined locations based on the information on the state of movement and the information on the rotational frequencies,
wherein the wheel localization device is further configured to verify that the signal comprising information on the rotational frequency of the wheel and the signal comprising information on the state of movement of the vehicle fulfill a predetermined relationship with respect to one another, before assigning a location.

23. A method for locating a position of a wheel on a vehicle, comprising:
obtaining information related to a state of movement of the vehicle using a detector device;
determining the position of the wheel based on the information related to the state of movement of the vehicle using a locator device,
using information on a rotational frequency of the wheel for the determining of the position of the wheel based on the information related to the state of movement, and
verifying that a signal indicating the rotational frequency of the wheel and a signal indicating the state of movement of the vehicle fulfill a predetermined relationship with respect to one another, before using the signals as information to determine the position of the wheel.

24. The method of claim 23, wherein the using comprises using information on rotational frequencies of a plurality of wheels on the vehicle, and wherein the determining comprises determining positions for each of the plurality of wheels on the vehicle based on the information on the plurality of rotational frequencies and the information related to the state of movement.

25. The method of claim 24, wherein the determining comprises assigning predefined positions on the vehicle to each of the plurality of wheels based on the information on the plurality of rotational frequencies and expected rotational frequencies, wherein the expected rotational frequencies are based on the information related to the state of movement.

26. The method of claim 23, wherein the verifying comprises verifying that the rotational frequency of the wheel and a rotational rate of the vehicle, which is based on the state of movement of the vehicle, fulfill a predefined relation for a predefined time interval.

27. The method of claim 23, further comprising correcting the rotational frequency of the wheel based on information on a tire pressure of a tire of the wheel to determine a corrected rotational frequency, and wherein the determining of the position of the wheel is based on a corrected rotational frequency.

28. A computer program having a program code on a non-transitory medium for performing, when the computer program is executed on a computer or on a processor, a method for locating a position of a wheel on a vehicle, comprising:
obtaining information related to a state of movement of the vehicle using a detector device;
determining the position of the wheel based on the information related to the state of movement of the vehicle using a locator device;
using information on a rotational frequency of the wheel for the determining of the position of the wheel based on the information related to the state of movement;
verifying that a signal indicating the rotational frequency of the wheel and a signal indicating the state of movement of the vehicle fulfill a predetermined relationship with respect to one another, before using the signals as information to determine the position of the wheel; and
sending the determined wheel position to a controller configured to associate the determined wheel position with a sensor of a tire pressure monitoring system.

* * * * *